(12) United States Patent
Rowlett et al.

(10) Patent No.: US 6,640,731 B1
(45) Date of Patent: Nov. 4, 2003

(54) DUAL TUNGSTEN CARBIDE BOOT

(75) Inventors: Don C. Rowlett, Bedford, PA (US); Gerry S. Swab, Rosthern (CA); James W. Henry, Saskatoon (CA); Dave Wiebe, Warman (CA)

(73) Assignees: Kennametal Inc., Latrobe, PA (US); Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 10/179,629

(22) Filed: Jun. 25, 2002

(51) Int. Cl.[7] .................................................. A01C 5/06
(52) U.S. Cl. ....................................... 111/152; 172/699
(58) Field of Search .................................. 111/149, 154, 111/123–126, 120, 152, 153, 156; 172/699, 730, 720–724, 701.1, 701.2, 701.3, 772, 772.5

(56) References Cited

U.S. PATENT DOCUMENTS

| | | | |
|---|---|---|---|
| 4,932,478 A | * 6/1990 | Jones | 172/699 |
| 5,159,985 A | 11/1992 | Rowlett | 172/723 |
| 5,297,637 A | 3/1994 | Rowlett | 172/604 |
| 5,310,009 A | 5/1994 | Rowlett | 172/723 |
| 5,314,029 A | 5/1994 | Rowlett | 172/699 |
| 5,325,799 A | 7/1994 | Rowlett | 111/152 |
| 5,415,236 A | * 5/1995 | Williams | 172/699 |
| 5,429,016 A | 7/1995 | Rowlett | 76/115 |
| 5,697,308 A | 12/1997 | Rowlett | 111/149 |
| 5,743,033 A | 4/1998 | Gegel | 37/460 |
| 6,318,279 B1 | 11/2001 | Rowlett et al. | 111/154 |
| 6,332,412 B1 | 12/2001 | Swab et al. | 111/152 |

* cited by examiner

*Primary Examiner*—Robert E. Pezzuto
(74) *Attorney, Agent, or Firm*—Larry R. Meenan

(57) ABSTRACT

A planting tool for depositing seed and/or fertilizer within a furrow including a soil opener and a seed boot attached to the soil opener. The seed boot includes a synclinal shape housing and at least one furrow forming wing that protrudes below the body of the seed boot. Each wing of the seed boot has at least one wear resistant leading insert positioned in front of and in juxtaposition to at least one wear resistant trailing insert that are each secured to at least a portion of the lower forward surface of the wing and that are each in juxtaposition to a portion of a furrow forming edge of the wing. The wear resistant leading insert and the wear resistant trailing insert have cobalt concentrations of from about 15 to 22 weight percent, and from about 8 to 14 weight percent, respectively.

45 Claims, 12 Drawing Sheets

DUAL TUNGSTEN CARBIDE BOOT

BACKGROUND OF THE INVENTION

1. Field of the Invention

The present invention relates to a seed boot attachment and wear resistant inserts therefor. More particularly, the seed boot attachment of the present invention includes cobalt and tungsten carbide inserts brazed to an austempered ductile iron or chrome casting to enhance wear life of the boot and to maintain the separation between the seed and the fertilizer and the depth of seed placement.

2. Description of the Related Art

The agricultural industry is employing larger and more efficient one-path planter systems for minimal tillage planting. The proper depositing of seeds and or seeds and fertilizer into a v-shaped furrow formed in the soil requires special care in handling the seeds and/or fertilizer and in maintaining the side walls of the furrow to ensure that the seed and/or fertilizer is/are deposited within the v-shaped furrow at the proper seed planting depths. If a seed boot is in a worn condition, loose soil from the sidewalls of a v-shaped furrow will spill into the furrow before the seed or seed and fertilizer are deposited. Alternatively, if the seed boot is in a worn condition, the seed and the fertilizer may be blown or bounced around or out of the furrow altogether such that the seed and fertilizer are prevented from being deposited in the furrow or from reaching a proper planting depth. To compensate for a worn seed boot in order to achieve proper seed planting depth and to prevent soil from collapsing in the v-shaped furrow prior to depositing of the seed and fertilizer, the worn seed boot must either be continually adjusted for proper height with the bottom of the furrow or the seed boot must be replaced. Replacement of a worn seed boot results in loss of planting time and reduced cost efficiency. Therefore, it will be appreciated that increasing the life of the parts of a seed planter shall also increase efficiencies in seed placement, crop yields, planting time and also decrease overall maintenance of the planters. Previous attempts to improve the wear life of the seed boot have met with limited success. For example, it was found that the heat treatment and quenching process of the manufacture of a seed boot resulted in cracks forming during the quenching process, thereby rendering the seed boot unacceptable. Furthermore, overlays of tungsten carbide materials in a base matrix resulted in a rough surface and protrusions such that soil material would build up on the seed boot. This caused poor seed bed quality and compromised seed and fertilizer separation.

Those skilled in the art shall appreciate that austempered ductile iron or chrome iron castings have been and are currently employed for the manufacture of a paired row and sideband seed boots. While these double shoot and single shoot seed boot castings allow for the separate placement of seed and fertilizer in one, pass, they each have drawbacks. Chrome iron castings are used for wearability but lack toughness. Austempered ductile iron castings are used for toughness but lack wearability. Carbide inserts have been employed and were successful in maintaining the shape of the furrows, but are very brittle and thus unacceptable.

U.S. Pat. No. 5,743,033 (Gegel) discloses a ground engaging tool for an earth working machine. Gegel discloses a ground engaging element comprising a metal base component and a metal matrix composite component wherein the metal matrix composite component is bonded to the metal base component. Gegel discloses that the metal matrix composite component is cast in place. The metal matrix composite component consists of a preform having interconnecting porosity. The preform is formed from a material selected from a ceramic, a cermet or mixtures thereof The preform is infiltrated by the infiltration metal and the infiltration metal is fusion bonded to the metal based component. Gegel is unconcerned and does not disclose the special dual carbide inserts of the present invention that are brazed to an austempered ductile iron casting. Gegel does not teach or suggest the dual carbide inserts of the present invention having a higher concentration of cobalt contained in the leading insert and a lower concentration of cobalt contained in the trailing insert.

U.S. Pat. No. 5,697,308 (Rowlett) discloses a seed boot for use with a furrow forming disc of a grain drill for depositing seed within a furrow. The seed boot has at least one side wear insert attached to the lower edge of the outer side of the seed boot to prevent side and down force wear of the seed boot. Rowlett teaches that the side wear inserts are comprised of a cemented tungsten carbide containing cobalt as a binder.

U.S. Pat. No. 6,318,279 (Rowlett et al.) discloses a seed boot attachment wherein a wear resistant insert is secured to at least one of the exterior leading surfaces of a furrow forming point of a seed boot. Rowlett et al. is unconcerned with and does not teach or suggest the use of dual carbide wear resistant inserts of the present invention.

U.S. Pat. No. 6,332,412B1 (Swab, et al.) discloses a ground engaging paired row furrow forming tool. Swab, et al. discloses a tool body having fore and aft ends, an outer edge on each of two opposing sides of the tool body, and a furrowing wing adjacent to each of the opposing sides of the tool body and protruding from the bottom portions of the tool body. Swab, et al. discloses that each wing includes an outer surface that extends downwards and inwards from the outer edge and a fore surface that extends from the central front portion of the lower surface of the tool body downwards and outwards to intersect with the outer surface of the wing at a furrowing edge portion of the wing. Swab et al. is unconcerned and does not disclose the dual carbide inserts of the present invention.

It will be appreciated that the earth working machinery industry has been designing ground engaging tools that have a combination of abrasion-resistance and impact-resistance over the years. Those skilled in the art understand that high wear resistance is achieved by increased hardness of a component while high impact strength is attained by increasing the fracture toughness of the component. Those skilled in the art in the industry are aware that the useful life of a cutting edge of a ground engaging component may be increased if it has a combination of both wear and impact resistance. In spite of this background art, however, there remains a very real and substantial need for an improved seed boot as provided by the instant invention to enhance wear life of the seed boot while maintaining the proper seed planting depths and the critical separation between the seed and the fertilizer, and the smooth flow of the seed boot through the soil.

SUMMARY OF THE INVENTION

The present invention provides a planting tool for depositing a fertilizer, a seed or both within a furrow. The planting tool comprises a soil opener and a single or paired row opener (seed boot) wherein the soil opener places fertilizer and the single or paired row opener places seed. The soil opener has a frontal lower body portion and an upper body portion and a rear portion and a rear portion. The soil opener includes a furrowing tip secured to the frontal lower body portion of the soil opener. Preferably, the planting tool includes a paired row opener (seed boot) fastened to the rear of the soil opener. The paired row seed boot includes two furrow forming wings that protrude below the body of the seed boot. The seed boot includes lower surfaces and upper surfaces, certain of which converge together to form outer edges that extend along the left and right sides of the seed boot. Each furrow forming wing has a forward lower surface, an inner surface and an outer surface. The seed boot of the present invention has at least one wear resistant leading insert secured to at least a portion of one of the forward lower surfaces of the furrow forming wings and at least one wear resistant trailing insert secured.to at least a portion of one of the forward lower surfaces of the furrow forming wings. The wear resistant leading insert is positioned in front of and in juxtaposition to the wear resistant trailing insert. Preferably, the wear resistant inserts are secured to the surfaces of the furrow forming wing by brazing.

In a preferred embodiment of this invention, the wear resistant leading insert comprises from about 15 to 22 weight percent cobalt with the remainder being tungsten carbide and wherein the wear resistant trailing insert comprises from about 8 to 14 weight percent cobalt with the remainder being tungsten carbide.

Another embodiment of this invention provides a modular seed planting system comprising an elongated tool bar supported for movement by a plurality of wheels and which is adapted to be towed in a given forward direction by a power source such as that provided by a tractor. Attached to the tool bar are a plurality of planting tools mounted along the length of the tool bar. Each planting tool includes a soil opener, and a seed boot attached to the soil opener. The seed boot comprises the seed boot of the present invention having the wear resistant inserts as described hereinabove and herein.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 9:
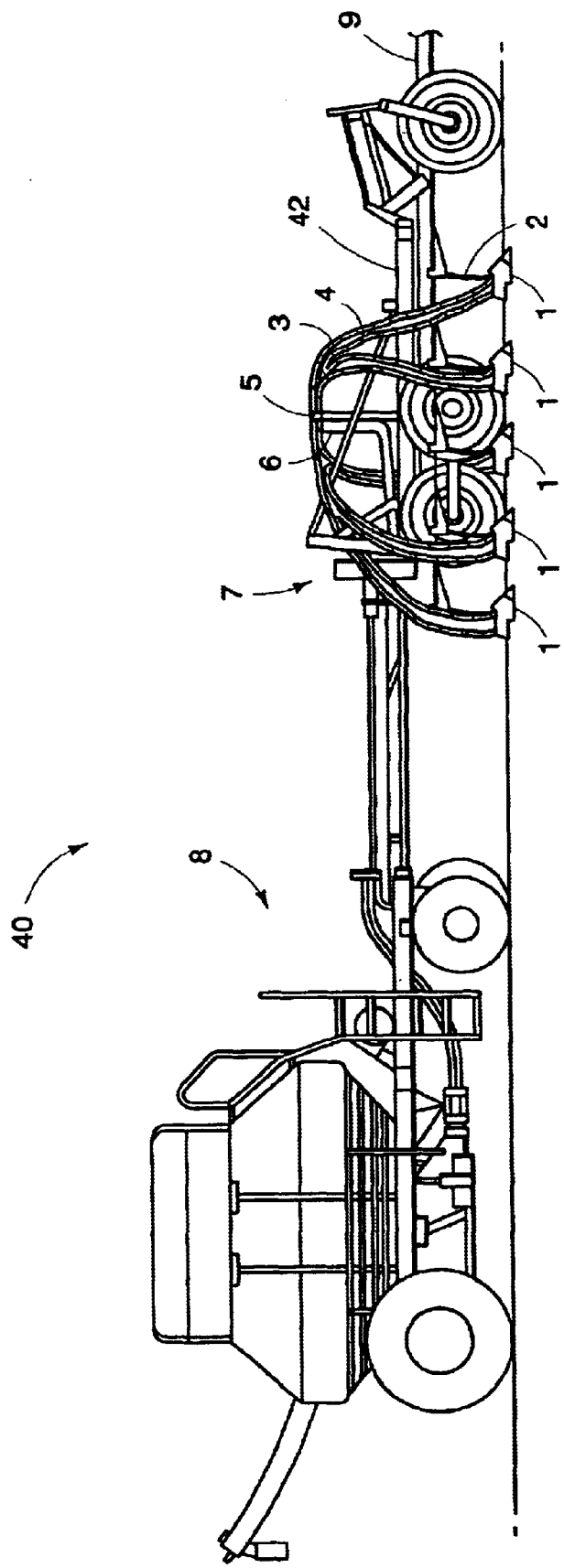
FIG. 9 is a side view of the planting system of the present invention.

Referring now to the drawings wherein the showings are for the purposes of illustrating the preferred embodiments of the invention only and not for purposes of limiting same, the invention shows a planting tool 1 having a soil opener 10 and a seed boot 20 that is preferably a paired row opener. The planting tool 1 is one component of a modular seed planting system 40, see FIG. 9. The seed planting system 40 includes a planting tool 1 that has a mounting portion 14 for securing to a shank 2. A plurality of planting tools 1 and shanks 2 are typically attached to a tillage implement 7 to one or more tool bars 42 shown in FIG. 9. A plurality of planting tools 1 are spaced on each toolbar. The spaced arrangement is selected to allow the best passage of field trash between adjacent planting tools 1 yet minimize soil ridging. For example, but not limited to, the planting tools, are spaced transversely to each other or in a side by side relationship relative to each other. Three to five toolbars 42 are typically provided, depending on the spacing desired between planted rows. The tillage implement 7 includes a hitch 9 for attachment to a power source such as for example a tractor or the like for pulling the implement 7 across a field. A product cart 8 can be towed behind the tillage implement 7, or alternately between the tractor and tillage implement 7. The product cart delivers seed and fertilizer through distribution headers 5, 6 and distribution lines 3, 4 to the planting tools 1 for planting in the soil.

Figure 1:
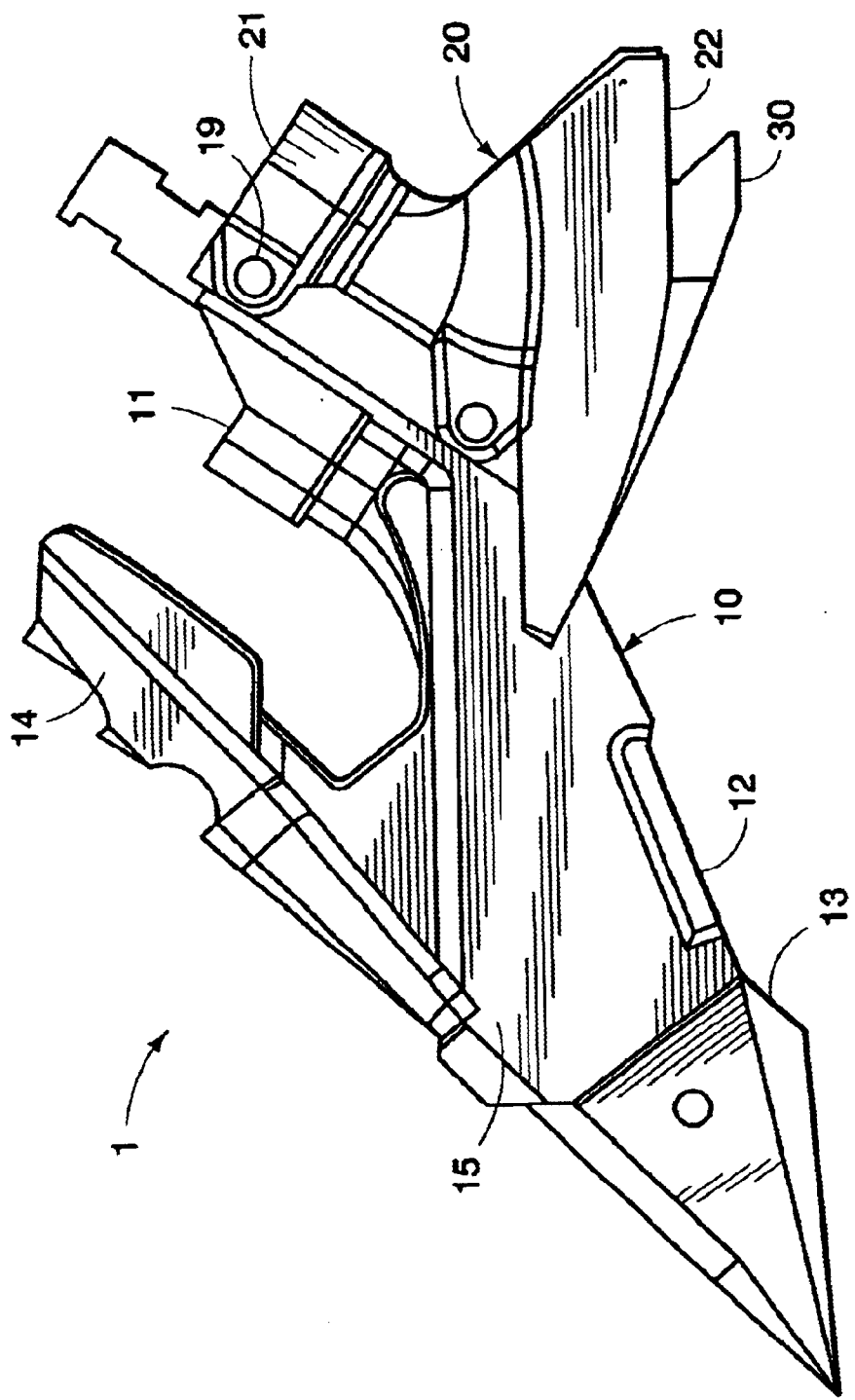
FIG. 1 is a side view of a planting tool of the present invention.

As seen in FIG. 1 the planting tool 1 comprises a soil opener 10 and a seed boot (preferably a paired row opener) 20. As will be understood by those skilled in the art, the soil opener and the seed boot may be made as an integral opener, but soil opener 10 is useful alone or in combination with other openers. The planting tool 1 is a combination tool for one pass fertilizing and paired row seeding. It operates in the soil at a set depth controlled by the tillage implement 7. In such operation, the soil opener 10 places fertilizer while the seed boot (paired row opener) 20 places seed. The soil opener 10 includes a furrowing tip 13 secured to the frontal lower body portion 15 of the soil opener 10. The upper body portion 14 of soil opener 10 is adapted for securing to a previously noted shank 2, in a well known manner. The soil opener 10 receives fertilizer at inlet 11 and directs it from a lower outlet 12 into a fertilizer furrow formed by furrowing tip 13.

Figure 5:
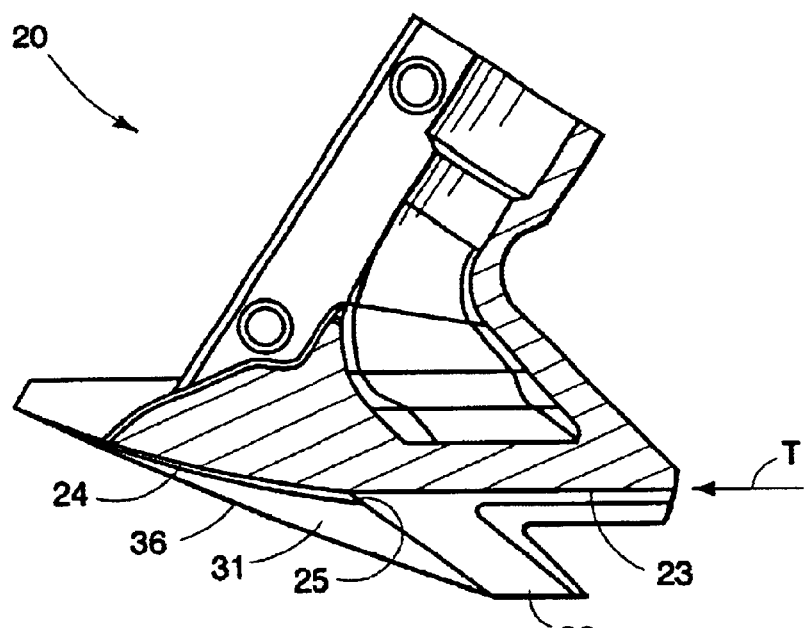
FIG. 5 is a view of a cross section taken through a line of symmetry of the seed boot of FIG. 6.
Figure 6:
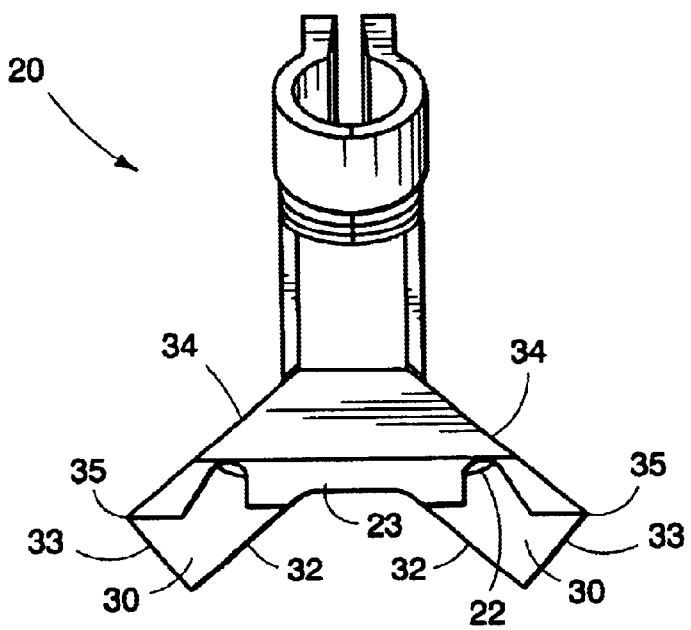
FIG. 6 is a rear view of the seed boot of FIG. 3.
Figure 7:
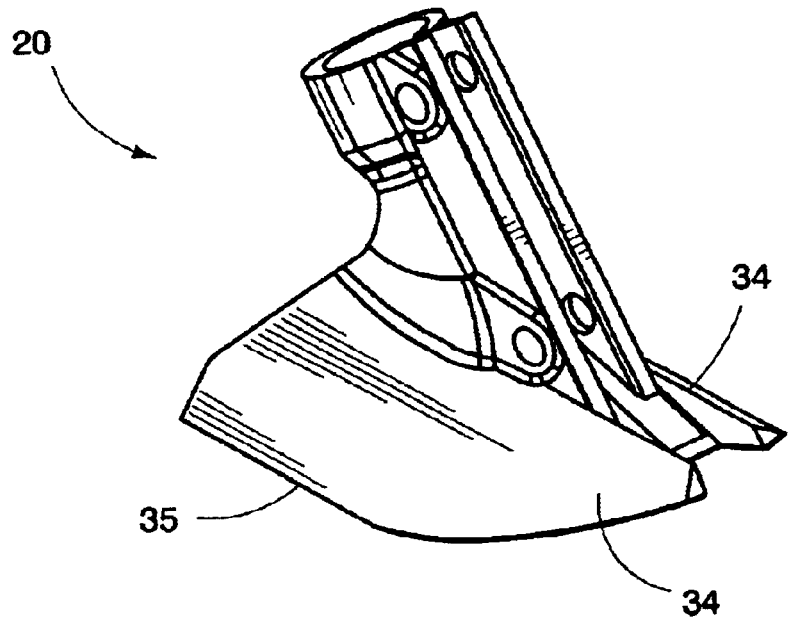
FIG. 7 is a top perspective view of the seed boot of FIG. 3.

The paired row seed boot 20 includes two furrowing wings 30 as best seen in FIGS. 5 and 6, each of which protrude below the body 18 of seed boot 20. Seed boot 20 receives seed at an inlet 21 and directs it from outlets 22 into paired furrows formed by lower surfaces of wings 30. A passage from inlet 21 within seed boot 20 divides into two passages having outlets 22 and randomly and evenly separates seed into a pair of streams to be placed in the paired furrows. The seed boot 20 is attached to the rear of the soil opener 10 by such as for example, but not limited to, fasteners 19 in a manner well known by those persons skilled in the art.

The body 18 of the seed boot 20 generally includes lower surfaces and upper surfaces, certain of which converge together to form outer edges 35 extending along the left and right sides of the seed boot 20. The outer edges 35 are curved inwardly and upwardly toward the front of the seed boot 20. This curvature provides for shedding of field trash which might otherwise become caught on the seed boot, in which event its operation is fouled and proper furrows are not formed. The left and right upper surfaces 34 of seed boot 20 are angled upwards and inwards from outer edges 35 of seed boot 20 to the narrower body 18 of the seed boot 20 and extend generally straight fore and aft in the direction of operation. Rearward portions of the outer edges 35 are straight and the seed boot 20 is operated with these straight portions generally horizontal and a depth in the soil at which the soil surface is at or above the edges 35 and along the upper surfaces 34 of seed boot 20. The upper surfaces 34 of seed boot 20 in operation slip below the soil surface with minimum disturbance of the soil surface.

Seed boot 20 is also suitable in sizes that have a width exceeding the trash cleared zone created by the soil opener 10. The outwardly curved outer edges 35 of seed boot 20 prevent trash being pulled into and under the furrow forming wings 30, and prevent trash from remaining caught on the outer edges 35. Moving along outer edges 35 from front to rear it will be seen that they gradually curve into general alignment with the direction of travel, so the parts of the outer edges 35 that are subject to field trash are generally aligned with the direction of travel and tend to shed off the trash.

Figure 8:
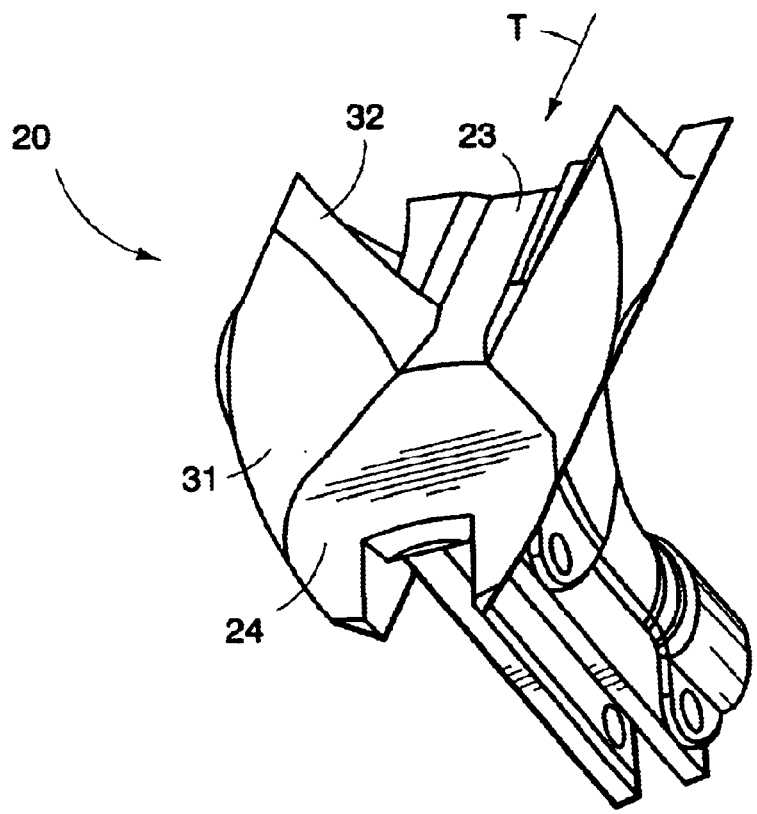
FIG. 8 is a bottom perspective view of the seed boot of the present invention.

The bottom side of seed boot 20 comprises a central surface, the profile of which can be seen in the cross section of FIG. 5. The central surface includes a central front portion 24 and a central rear surface portion 23 (FIG. 3 and FIG. 4) extending rearwardly therefrom in alignment with the direction of travel T (FIGS. 5 and 8). Central rear surface portion 23 is preferably at least about 3/4 (three-fourths) inch wide. The central rear surface portion 23 preferably is generally flat and level when in operation and the central front surface portion 24 is preferably angled slightly upwards and forwards relative to central rear surface portion 23. These surface portions 23, 24 are preferably blended together by a smoothly curved transition region 25 (FIG. 5) between them rather than having a distinct edge at which they intersect. This curvature is generally convex fore to aft and helps prevent soil from binding. The central front surface portion 24 presses soil downwards at a decreasing rate as it passes beneath the surface so that soil is not simultaneously subject to pressure from the wings 30 in a combination of forces that may otherwise cause relative movement of the soil to stall. The tool is normally oriented in operation so the central front surface portion 24 is angled upwards from the horizontal. There is preferably about 3/8 (three-eighths) inch rise in the central front surface portion 24 from the rear to the front edge.

Figure 4:
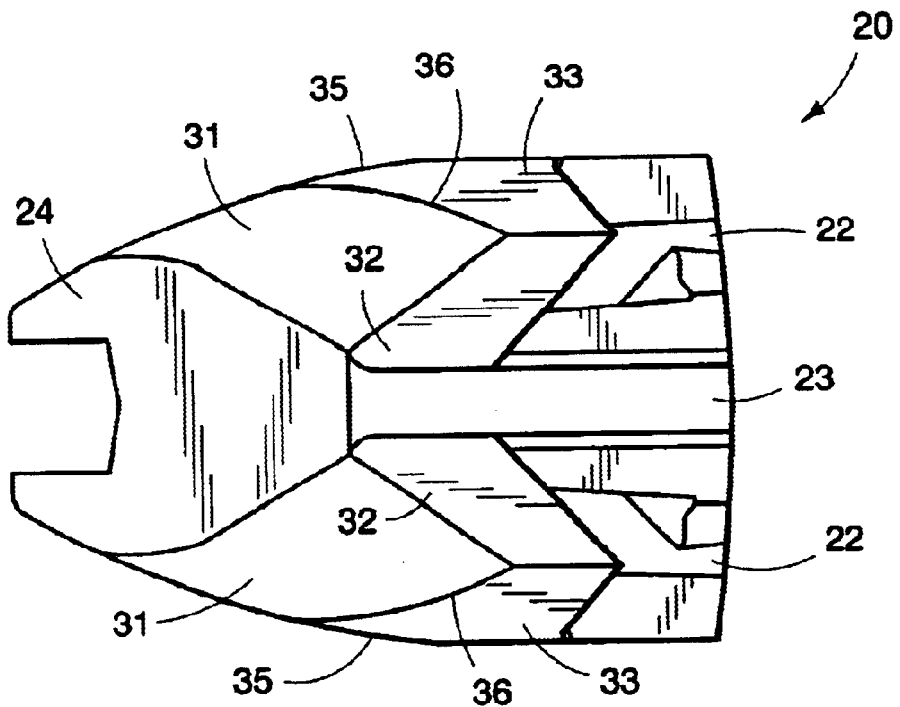
FIG. 4 is bottom view of the seed boot of FIG. 3.

A furrow forming wing 30 as previously noted is positioned to each side of the central surface portion 23, 24 as seen in FIG. 4 and FIG. 6. Each wing 30 includes a forward lower surface 31, an inner surface 32, and an outer surface 33. The dihedral angle between inner surfaces 32 of wings 30 is shown as being approximately 90 degrees although this angle can be varied as will be appreciated by those skilled in the art. The wing forward lower surfaces 31 are arranged in flanking relation to the central front surface portion 24 and each wing forward lower surface 31 extends laterally, rearwards and downwards from the central front surface portion 24. The wing forward lower surfaces 31 are therefore inclined such as to slightly face each other, and they taper inwards and rearwards so in operation they direct some soil inwards and downwards over the fertilizer furrow formed by the soil opener 10. The wing inner surfaces 32 extend outwards and downwards from the central rear surface portion 23, and intersect with the wing forward lower surface 31. The wing outer surfaces 33 extend inwards and downwards from outer edges 35 to intersect with forward lower surface 31 and inner surface 32 and defining furrow forming edges 36 which are angled inwardly from fore to aft before reaching the extension edges 36 which are parallel to each other and to the travel direction T. In FIG. 6 the rear view of seed boot 20 is shown such that wing inner surfaces 32 and outer surfaces 33 converge to form V-shape profiles which operate to form corresponding V-shaped furrows. The tips of the V-shapes (which are defined by the extension edges 36) are preferably spaced apart at least about 3 (three) inches. The wing inner and outer surfaces 32, 33, respectively, extend generally parallel to the direction of travel T thus giving the wings 30 a longer wear life in which they maintain their furrow forming profile. A forward part of each wing outer surface 33 is curved to follow the associated curved outer edge 35. Preferably the wing forward lower surface 31 is curved toward the rear to blend with wing inner surface 32 so there is no distinct edge along the intersection of these surfaces. The central rear surface portion 23, and the central front surface portion 24 also blend along curved intersections with wing forward lower surfaces 31 and wing inner surfaces 32 so there are no distinct edges of intersection. This promotes smooth soil flow and prevents soil binding which often is evident where surfaces intersect at edges, particularly at sharper angles.

Figure 3:
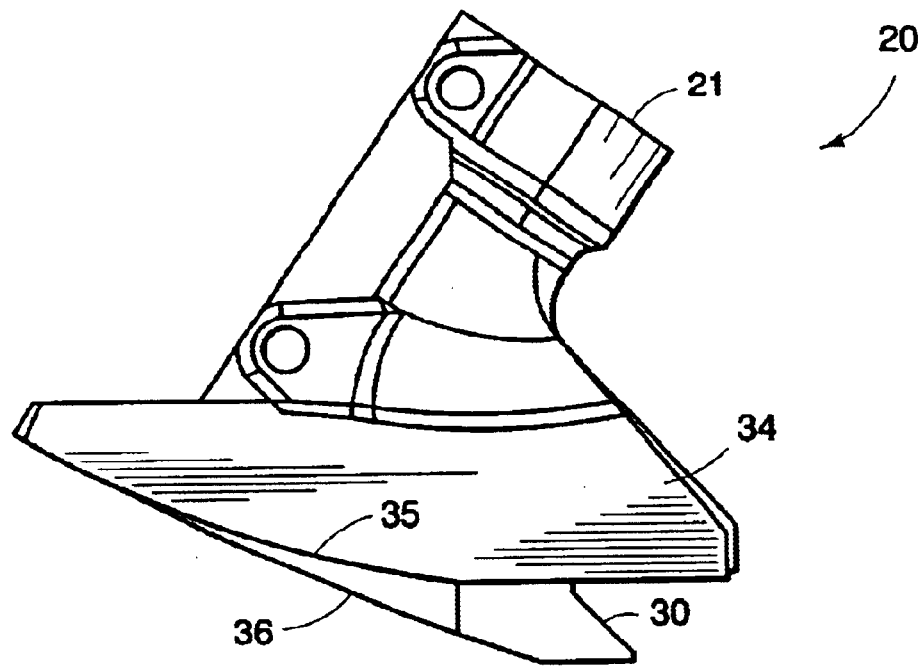
FIG. 3 is a side view of a paired row furrowing and seed boot of the present invention.

The furrow forming edges 36 of the forward lower surfaces 31 of the wings 30 appear as substantially straight in a side profile as can be seen in FIG. 3 and FIG. 5. This is generally the same across the forward lower surfaces 31 and through the intersections with the central front surface portion 24 so that there is little to no concave curvature or angles in a plane in the direction of travel, in which soil can hang up and bind. Central rear surface portion 23 provides a free central passage between wings 30 where the soil is not simultaneously subject to downward deflection as the V-shaped furrows are being formed. Preferably, the central rear surface portion 23 provides a space of about 3/4 (threefourths) inch minimum between the bases of the wings 30 to provide a free passage for soil flow. This is in contrast to certain background art designs in which a surface between furrow forming wings continues to deflect soil downwards during furrow formation. A small fillet or radius is formed between the wing inner surfaces 32 and central rear surface portion 23 to provide free passage of soil.

Seed passage outlets 22, best seen in FIG. 6, are positioned behind each wing 30 with the outlets terminating above the lowermost edge 36 of each wing, preferably a distance of 3/4 (three-fourths) inch, which provides good control of material placement and prevents soil from blocking the outlets.

In operation, the seed boot 20 is generally oriented with central rear surface portion 23 substantially horizontal (see FIG. 5). It may be slightly trimmed from this orientation with central rear surface portion 23 angled such as for example but not limited to about one or two degrees upward or downward from front to rear, depending on soil conditions. This can be achieved by adjusting a stop on a tripping device supporting the shank 2, or by using shims in mounting the planting tool 1 to change its angle relative to the shank 2 as will be understood by those skilled in the art.

Figure 2:
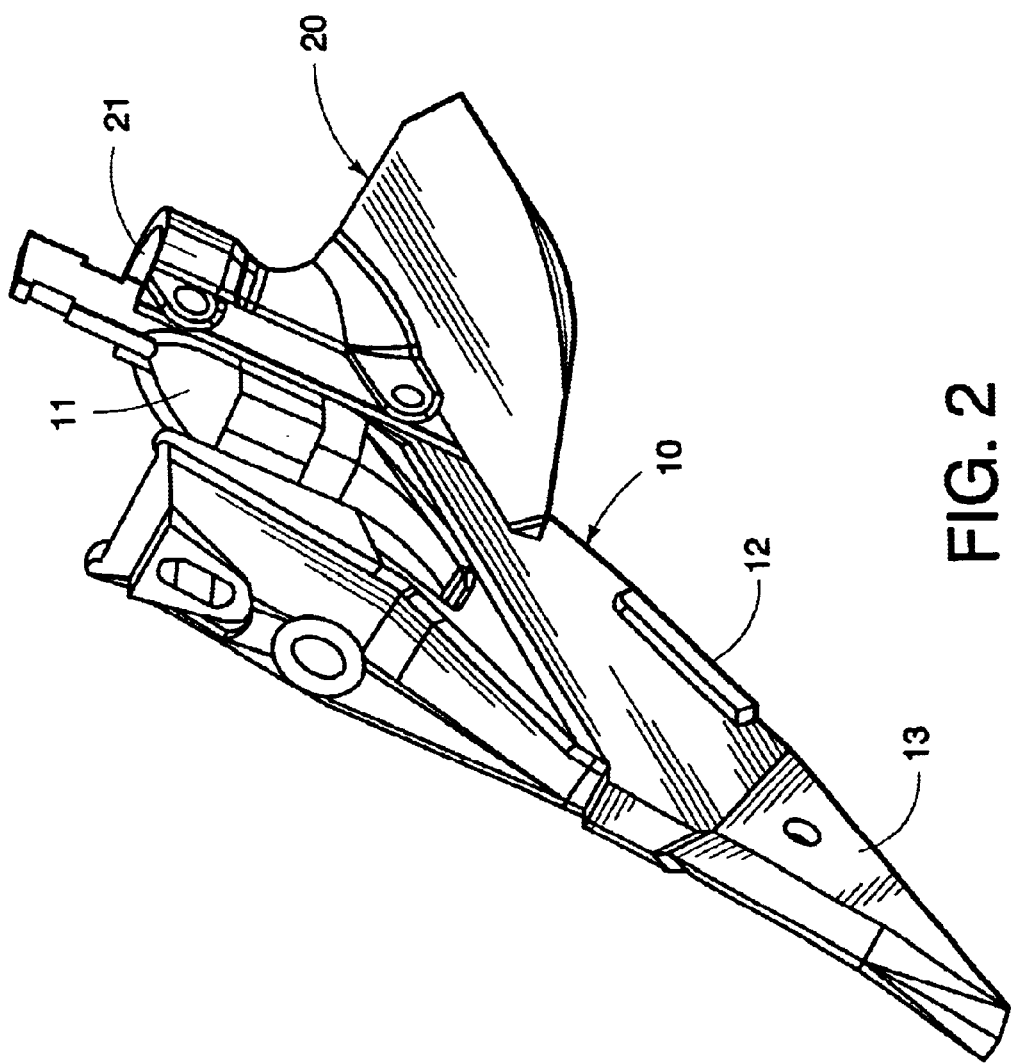
FIG. 2 is a perspective view of the planting tool set forth in FIG. 1.

As is well known in the art, the planting tools 1 are mounted, such as for example but not limited to, in a side-by-side relation relative to each other along the length of the tool bar 42. In the illustrated embodiment as shown in FIGS. 1 and 2, each planting tool 1 preferably includes a replaceable ground furrowing tip 13, a lower body 15, an upper body 14, and a rear seed boot 20 that may be made by casting from austempered ductile iron, chrome iron and the like or otherwise formed as individually connected steel parts. The planting tool 1 is of a design commercially available from Flex-Coil, Ltd. of Saskatchewan, Canada. This seeding configuration of planting tool 1 is generally accepted and used over a wide area of the great plains of North America. It will be appreciated that within this geographic region many different soil types occur. The present invention is primarily concerned with soil that can be characterized as having highly abrasive properties. These types of soils significantly reduce the wear life of the furrowing tips 13 and seed boots 20 thereby increasing maintenance costs and downtime as previously described. Further, mulch pick up during the planting process, known by those skilled in the art as "hooking" is a problem that reduces the life of the seed boot.

Seed and fertilizer are typically delivered from conventional storage boxes or product carts 8 to a metering assembly (not shown) of conventional design that supplies a controlled volume of seed and fertilizer to, preferably, flexible distribution lines 34 to the planting tools 1. The lower end of the distribution lines direct the seeds and fertilizer into separate inlets of the body member 15 and through passages in the body member 15 to the seed boot 20, for distribution in a single row or preferably paired rows into a furrow created by the seed boot 20. For a more detailed discussion of the metering assembly reference is made to U.S. Pat. No. 6,158,363, incorporated herein by reference.

As shown in the figures, the seed boot 20 splits seed from the body member 15 into two rows preferably about 3 inches apart. The paired row of seeds straddles a single row of fertilizer. The fertilizer is preferably placed about 1 inch deeper in the middle furrow than the seeds are placed in the adjacent rows.

It will be appreciated that the maintenance of the vertical and horizontal separations between the seed and fertilizer is critical to maintain seedling safety. The relative seed and fertilizer placements also position fertilizer where the plant roots are most likely to intercept it. If the separation is compromised, varying degrees of seedling germination damage can occur. In situations where high rates of nutrients are in direct contact with germinating seeds, there is a high probability of seedling mortality. As the furrow forming wings 30 wear, they become smaller and seed separation from the fertilizer is reduced and risk of seedling injury increases. When the furrow forming wings 30 have reached their wear limit, soil will block the seed outlets and there is minimal separation between seed and fertilizer.

In accordance with the present invention FIGS. 14–17 show a wear resistant leading insert 52 that is secured to the furrow forming wings 30. The insert 52 is preferably secured to the furrow forming wings 30 before any austempering process by employing a high temperature brazing process, well known by those skilled in the art, that withstands austempering temperatures.

As shown in FIGS. 14–17, a wear resistant leading insert 52 is secured to at least a portion of one of the forward lower surfaces 31 of the furrow forming wings 30. The wear resistant inserts generally are of a shape to enhance material flow over the insert and reduce susceptibility to breakage from impacts on obstructions and the like in the soil. The present invention includes at least one wear resistant trailing insert 53 secured to at least a portion of one of the forward lower surfaces 31 of the furrow forming wings 30. The wear resistant leading insert 52 is positioned in front of and in juxtaposition to the wear resistant trailing insert 53 and secured to the exterior of the furrow forming wing 30, preferably, by brazing.

Figure 10:
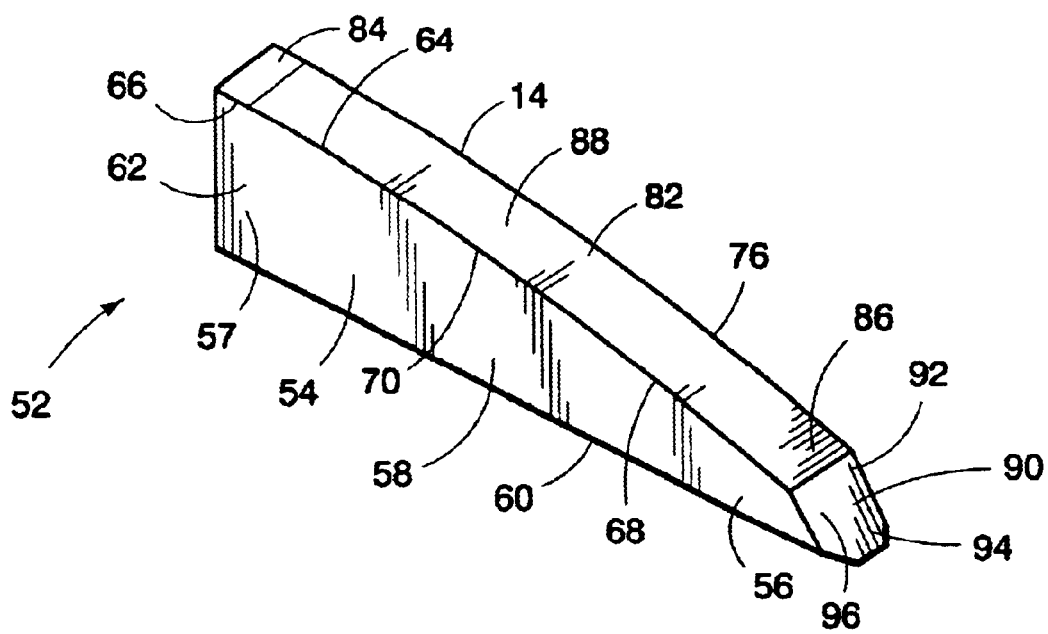
FIG. 10 is a perspective view of the wear resistant leading insert of the present invention.
Figure 11:
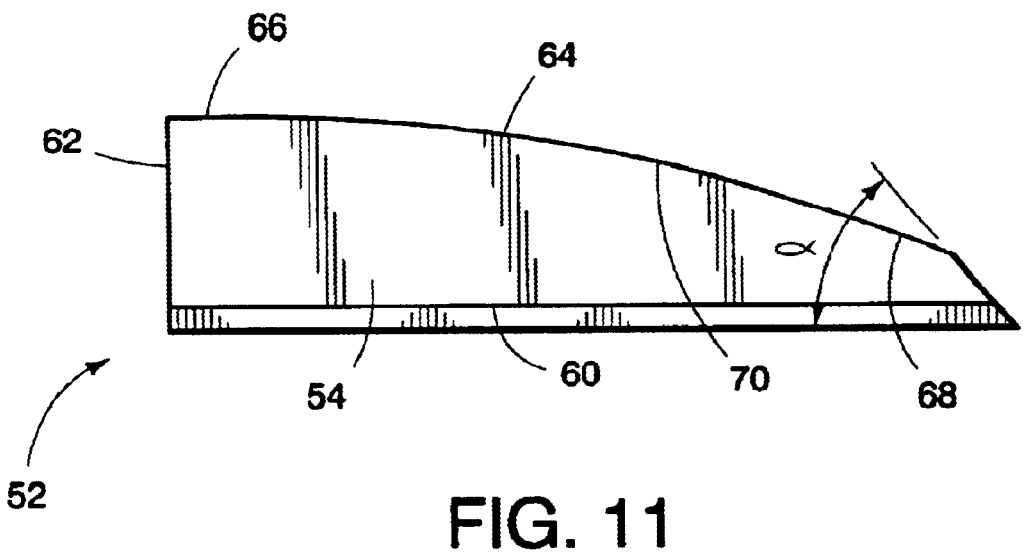
FIG. 11 is a side view of the wear resistant leading insert of the present invention.
Figure 12:
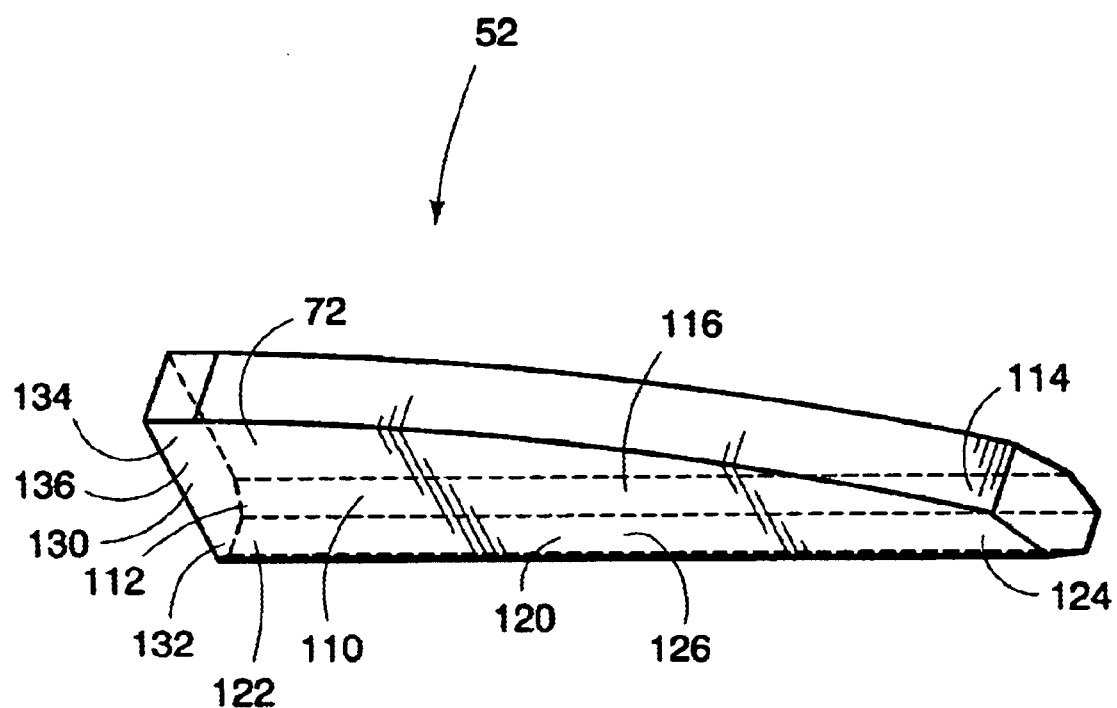
FIG. 12 is a perspective view of the wear resistant leading insert of the present invention.

In one embodiment of the present invention, the wear resistant leading insert 52 comprises a top face 54 (FIGS. 10–12) having a first end 56, a second end 57 and a middle section 58 disposed between the first 56 and the second 57 ends, respectively. The top face 54 has a first side 60 and a second side 62 that is at a right angle in relationship to and in communication with the first side 60 of the top face 54, and a hypotenuse side 64 having a flat first end 66, an arcuate shaped second end 68, and an arcuate shaped middle section 70 that is disposed between the flat first end 66 and the arcuate shaped second end 68. The first end 66 of the hypotenuse side 64 is in communication with the second side 62 of the top face 54. The second end 68 of the hypotenuse side 64 is in communication with the first end 56 of the top face 54. The wear resistant leading insert further has a bottom face 72 (shown in FIG. 12) that is parallel to and opposes the top face 54 and that is a mirror image of the top face 54. The wear resistant leading insert has a first face 82 that separates the top face 54 from the bottom face 72 and wherein the first face 82 is in communication with and follows along the paths formed by the hypotenuse sides 64, and 74 of the top and bottom faces 54 and 72, respectively. The first face 82 has a first end 84, a second end 86, and a middle section 88 that is disposed between the first 84 and the second ends 86, respectively. The first end 84 of the first face 82 has a flat surface that is in communication with a downwardly angled surface of the middle section 88, and wherein the second end 86 of the first face 82 is in communication with and is positioned in a downwardly angled direction in relationship to the middle section 88.

The wear resistant leading insert 52 has an angled nose face 90 having six sides and having a first end 92, a second end 94 and a middle section 96 that is disposed between the first 92 and the second 96 ends, respectively. The first end 92 of the nose face 90 is in communication with the second end 86 of the first face 82 and wherein the second end 94 of the nose face 90 is in communication with each of the first ends 56 and 76 of the top face and the bottom face, respectively. The second end 94 of the nose face 90 comprises three of the six sides of the nose face 90 including wherein three sides of the second end 94 form a relaxed "U" shape.

The wear resistant leading insert 52 has a second face 100 (not shown in FIG. 12), a fourth face 110 (shown in FIG. 12) and a third face 120 (shown in FIG. 12) that is disposed between the second face 100 and the fourth face 110. The third face 120 is opposed to the first face 82, wherein one side of the second face 100 is positioned inwardly and downwardly in relationship to the first side 60 of the top face 54. One side of the fourth face 110 is positioned inwardly and downwardly in relationship to the first side (not shown) of the bottom face 72. The third face 120 is in communication with the second face 100 and the fourth face 110, respectively, to form a relaxed "U" shape. Each of the second, third and fourth faces, respectively, have a first end 102, 122, and 112, respectively, a second end 104, 124, and 114, respectively, and a middle section 106, 126, and 116, respectively, disposed between the first ends 102, 122, and 112, respectively, and the second ends 104, 124 and 114, respectively The second ends of the second, third and fourth faces, respectively are in communication with at least three of the sides making up said relaxed "U" shape of the second end 94 of the nose face 90.

The wear resistant leading insert has a rear face 130 having a relaxed "U" shaped first end 132, a straight shaped second end 134, and a planar middle section 136 disposed between the first 132 and the second ends 134, respectively. The relaxed "U" shaped first end 132 of the rear face 130 is in communication with the first ends 102, 122, and 112, respectively, of the second, third and fourth faces 100, 120 and 110, respectively. The second end 134 of the rear face 130 is in communication with the first end 84 of said flat first face 82.

The resistant leading and trailing inserts of the present invention are formed from cemented carbide having a cobalt content from about 8 to 22 weight percent. Preferably, the wear resistant leading and trailing inserts are formed from a material selected from the group consisting of tungsten carbide and tungsten-titanium carbide and include a cobalt concentration of from about 8 to 22 weight percent. More preferably, the leading insert is formed from cemented carbide comprising a cobalt concentration of from about 15 to 22 weight percent. Even more preferably, the wear resistant leading insert comprises from about 15 to 22 weight percent cobalt and the remainder being tungsten carbide. Preferably, the wear resistant trailing insert is formed from cemented carbide comprising a cobalt concentration of from about 8 to 14 weight percent. Even more preferably, the wear resistant trailing insert comprises from about 8 to 14 weight percent cobalt and the remainder being tungsten carbide. Most preferably, the wear resistant leading insert has a cobalt concentration of about 20 weight percent with the remainder being tungsten carbide. Most preferably, the wear resistant trailing insert has a cobalt concentration of about 11 weight percent with the remainder being tungsten carbide.

In an alternate embodiment of the present invention, the first sides of the top face 54 and the bottom face 72, respectively, are chamfered. It will be appreciated by those skilled in the art that other shaped combinations of the leading and trailing inserts described herein can be used in accordance with the teachings of this invention and that the sides of the faces described herein may be modified to include chamfered ends and wherein the corners where the sides meet may be radiused or rounded.

The angled nose face 90 has a slope that proceeds downward from the second end 86 of the first face 82 to the first ends 56, 76 of the top 54 and bottom faces 72, respectively. The nose face 90 preferably has a slope (defined by the alpha symbol in FIG. 11) of from about 40 to 60 degrees, and more preferably, about 45 to 50 degrees.

Figure 13:
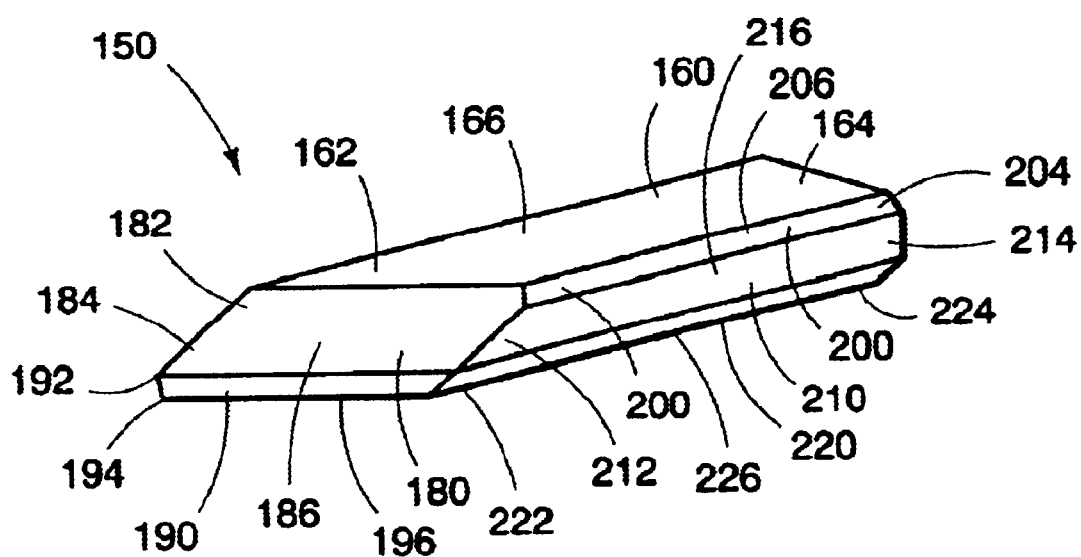
FIG. 13 is a perspective view of the wear resistant trailing insert of the present invention.
Figure 14:
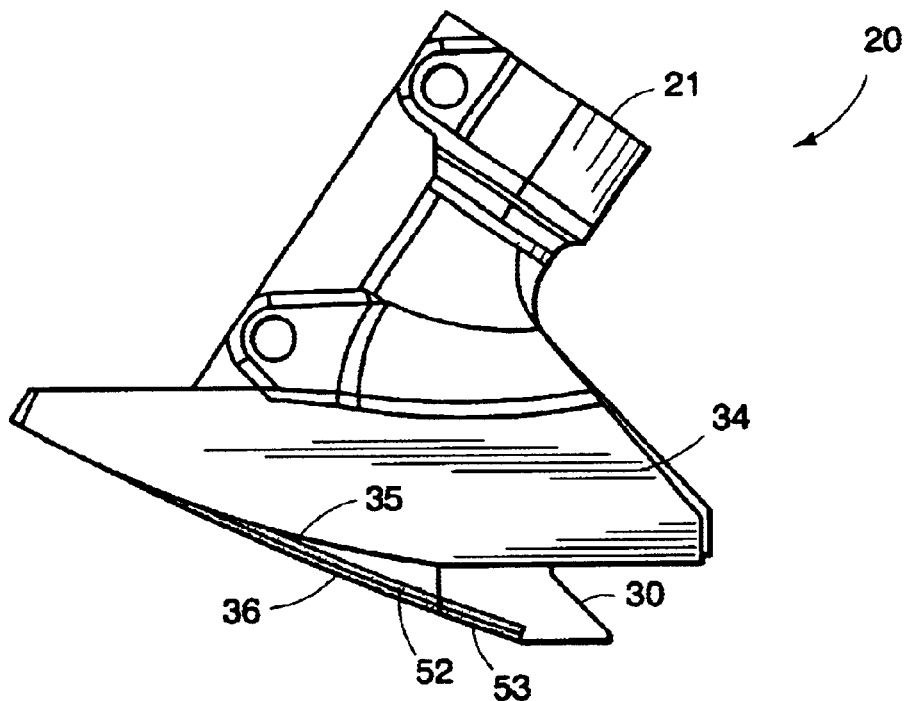
FIG. 14 is a side view of a paired row furrowing and seed boot having the wear resistant leading and trailing inserts of the present invention.
Figure 15:
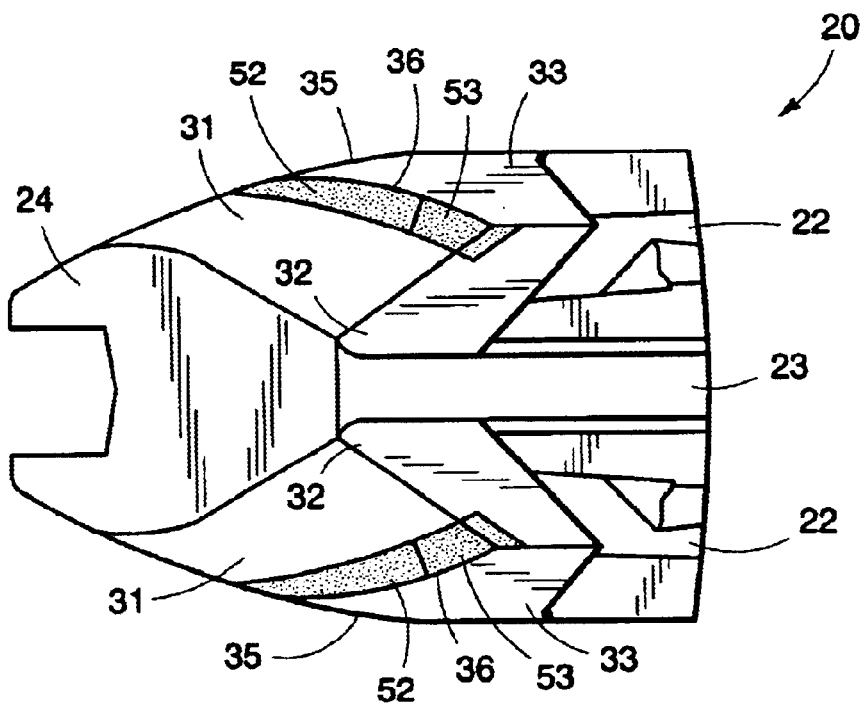
FIG. 15 is a bottom view of the seed boot having the wear resistant leading and trailing inserts of the present invention.
Figure 16:
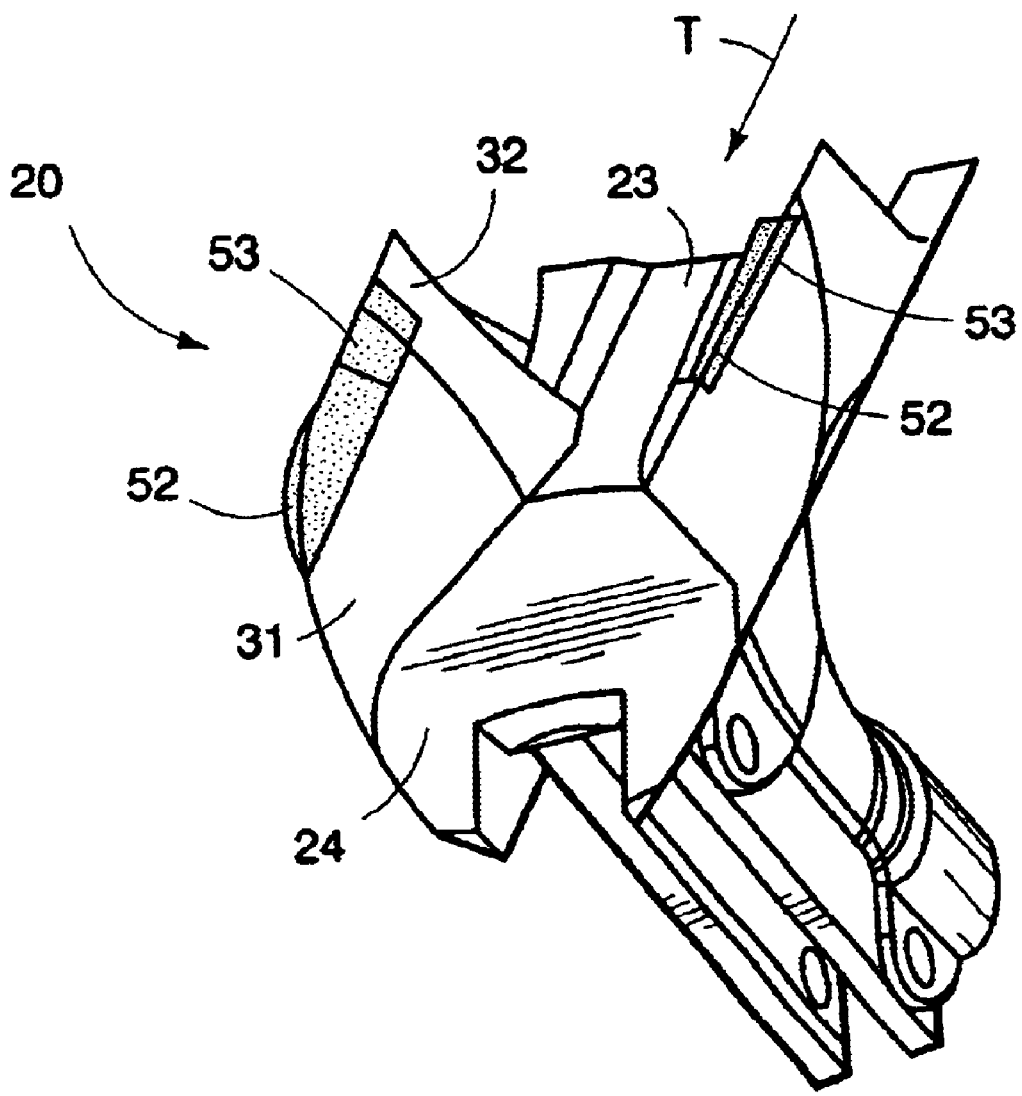
FIG. 16 is a bottom view of the seed boot having the wear resistant leading and trailing inserts of the present invention.
Figure 17:
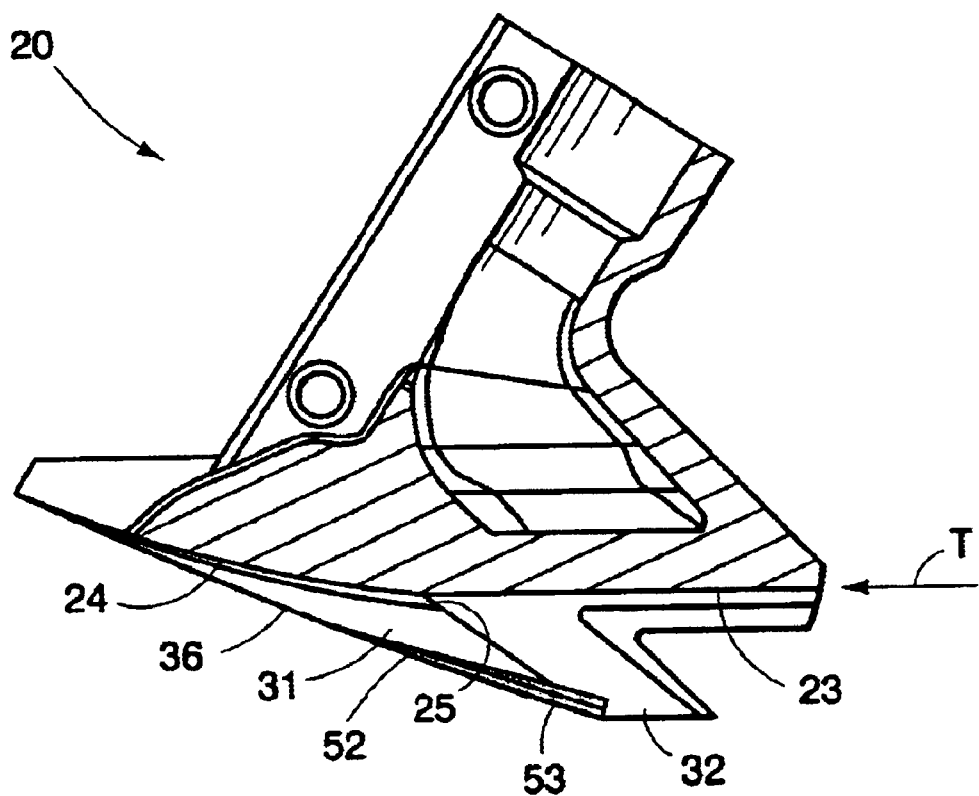
FIG. 17 is a view of a cross section taken through a line of synmmetry of the seed boot of FIG. 6 including the wear resistant leading and trailing inserts of the present invention.

The wear resistant trailing insert 150, FIG. 13, comprises a top face (not shown) having a trapezoidal shape, a bottom face 160 that is parallel to and opposes the top face. The bottom face. 160 has a first end 162, a second end 164 and a middle section 166 disposed between the first end 162 and the second end 164. Further, the trailing insert 150 has a first face (not shown) that separates the top face from the bottom face 160. The first face has a first end, a second end, and a middle section disposed between the first end and the second end.

The wear resistant trailing insert of the present invention further has an angled nose face 180 having 5 sides and having a first end 182, a second end 184, and a middle section 186 disposed between the first end 182 and the second end 184, and wherein the first end 182 of the nose face 180 is in communication with the first end 162 of the bottom face 160.

The trailing insert 150 has a flank face 190 positioned downward from the nose face 180, wherein the flank face 190 has a first end 192, a second end 194, and a middle section 196 disposed between the first end 192 and the second end 194. The first end 192 of the flank face 190 is in communication with the second end 194 of the nose face 180.

The trailing insert 150 has a second face 200, a fourth face 220 and a third face 210 that is disposed between the second face 200 and the fourth face 220. The third face 210 is opposed to the first face (not shown). One side of the second face 200 is positioned outwardly and downwardly in relationship to the bottom face 160, and wherein the fourth face 220 is positioned outwardly and downwardly in relationship to the top face (not shown). The third face 210 is in communication with the second face 200 and the fourth face 220, respectively, to form a relaxed "U" shape. Each of the second, third and fourth faces, 200, 210, 220, respectively, each have a first end 202, 212, 222, respectively, a second end 204, 214, 224, respectively, and a middle section 206, 216, 226, respectively, disposed between the first and second ends, respectively. The first end 202 of the second face 200 and the first end 212 of the third face 210 are each in communication with a side of the nose face 180. The first end 222 of the fourth face 220 is in communication with a side of the flank face 190.

Further, the wear resistant trailing insert 150 has a rear face (not shown) having a first end, a second end, and a middle section disposed between the first end and the second end, and wherein the first end of the rear face forms a relaxed "U" shape that is in communication with the second ends 204, 214, 224, respectively, of the second, third and fourth faces, 200, 210, 220, respectively. The second end of the rear face is in communication with the second end of the first face (not shown).

it will be appreciated that although the illustrated inserts are generally triangular or trapezoidal in shape, still other insert configurations can be used in accordance with the teachings of this invention so long as the leading insert has a higher cobalt concentration in relationship to the cobalt concentration of the trailing insert as set forth herein. The dual carbide cobalt inserts of the present invention that places the higher cobalt containing insert in front (i.e., leading insert) of the lower cobalt containing insert (i.e., trailing insert) also prevent field mulch pick-up (i.e., hooking) during planting. The leading insert of the present invention having a higher cobalt concentration helps to resist carbide breakage with its higher impact physical properties. Thus, it will be understood by those skilled in the art that the seed boot having the wear resistant inserts of the present invention enhance the smooth flow of the seed boot through abrasive soil, firms the seed bed and prevents the premature wearing of the seed boot, all of which increase planting process efficiencies and reduce overall costs.

While the invention has been specifically described in connection with certain specific embodiments thereof, it is to be understood that this is by way of illustration and not of limitation, and the scope of the appended claims should be construed as broadly as the prior art will permit. It will be evident to those skilled in the art that numerous variations of the details of the present invention may be made without departing from the invention as defined in the appended claims.

What is claimed is:

1. A seed boot for depositing a seed within a furrow comprising:

a synclinal shape housing extending to a forward point, at least one furrow forming wing having an outer surface extending downwards and inwards from said housing and an inner surface extending downwards and inwards from said housing such that said outer surface and said inner surface oppose each other and converge from opposing side edges of a forward lower surface of said wing wherein one of said side edges of said forward lower surface of said wing is a furrow forming edge;

at least one wear resistant leading insert secured to at least a portion of said forward lower surface of said wing and in juxtaposition to said furrow forming edge of said wing; and at least one wear resistant trailing insert secured to at least a portion of said forward lower surface of said wing and in juxtaposition to said furrow forming edge, and wherein said wear resistant leading insert is positioned in front of and in juxtaposition to said wear resistant trailing insert.

2. The seed boot of claim 1 wherein said wear resistant leading insert comprises:

a top face having a first end, a second end and a middle section disposed between said first and said second ends, respectively, and wherein said top face has a first side and a second side that is at a right angle in relationship to and in communication with said first side of said top face, and a hypotenuse side having a flat first end, an arcuate shaped second end, and an arcuate shaped middle section that is disposed between said flat first end and said arcuate shaped second end, wherein said first end of said hypotenuse side is in communication with said second side of said top face and wherein said second end of said hypotenuse side is in communication with said first side of said top face;

a bottom face that is parallel to and opposes said top face and that is a mirror image of said top face, and wherein said bottom face has a first end, a second end and a middle section disposed between said first end and said second end of said bottom face;

a first face that separates said top face from said bottom face, wherein said first face is in communication with and follows along the paths formed by said hypotenuse sides of said top and bottom faces, respectively, wherein said first face has a first end, a second end, and a middle section that is disposed between said first and said second ends, respectively, of said first face, wherein said first end of said first face has a flat surface that is in communication with a downwardly angled surface of said middle section, and wherein said second end of said first face is in communication with and is positioned in a downwardly angled direction in relationship to said middle section;

an angled nose face having six sides and having a first end, a second end and a middle section that is disposed between said first and second ends, respectively, wherein said first end of said nose face is in communication with said second end of said first face, wherein said second end of said nose face is in communication with each of said first ends of said top face and said bottom face, respectively, and wherein said second end of said nose comprises three of said six sides including wherein said three sides of said second end form a relaxed "U" shape;

a second face, a fourth face and a third face that is disposed between said second face and said fourth face, wherein said third face is opposed to said first face, wherein one side of said second face is positioned inwardly and downwardly in relationship to said first side of said top face, wherein one side of said fourth face is positioned inwardly and downwardly in relationship to said first side of said bottom face, wherein said third face is in communication with said second face and said fourth face, respectively, to form a relaxed "U" shape, and wherein each of said second, third and fourth faces, respectively, have a first end, a second end and a middle section disposed between said first and said second ends, respectively, and wherein said second ends of said second, third and fourth faces, respectively are in communication with at least three of said sides making up said relaxed "U" shape of said second end of said nose face; and a rear face having a relaxed "U" shaped first end, a straight shaped second end, and a planar middle section disposed between said first and said second ends, respectively, of said rear face, wherein said relaxed "U" shaped first end of said rear face is in communication with said first ends of said second, third and fourth faces, respectively, and wherein said second end of said rear face is in communication with said first end of said flat first face.

3. The seed boot of claim 1 wherein said wear resistant leading and trailing inserts are formed from cemented carbide having a cobalt content from about 8 to 22 weight percent.

4. The seed boot of claim 1 wherein said wear resistant leading and trailing inserts are formed from a material selected from the group consisting of tungsten carbide and tungsten-titanium carbide and including a cobalt concentration of from about 8 to 22 weight percent.

5. The seed boot of claim 4 wherein said wear resistant leading insert is formed from cemented carbide comprising a cobalt concentration of from about 15 to 22 weight percent.

6. The seed boot of claim 1 wherein said wear resistant leading insert comprises from about 15 to 22 weight percent cobalt and the remainder being tungsten carbide.

7. The seed boot of claim 4 wherein said wear resistant trailing insert is formed from cemented carbide comprising a cobalt concentration of from about 8 to 14 weight percent.

8. The seed boot of claim 1 wherein said wear resistant trailing insert comprises from about 8 to 14 weight percent cobalt and the remainder being tungsten carbide.

9. The seed boot of claim 6 wherein said cobalt concentration is about 20 weight percent.

10. The seed boot of claim 8 wherein said cobalt concentration is about 11 weight percent.

11. The wear resistant leading insert of said seed boot of claim 2 wherein each of said first side of said top face and said bottom face, respectively, are chamfered.

12. The wear resistant seed boot of claim 2 wherein said angled nose face has a slope that proceeds downward from said second end of said first face to said first ends of said top and bottom faces, respectively.

13. The wear resistant seed boot of claim 12 wherein said slope of said nose face is from about 40 to 60 degrees.

14. The wear resistant seed boot of claim 13 wherein said slope of said nose face is about 50 degrees.

15. The wear resistant seed boot of claim 13 wherein said slope of said nose face is about 45 degrees.

16. The seed boot of claim 1 wherein said wear resistant trailing insert comprises:
   a top face having a trapezoidal shape;
   a bottom face that is parallel to and opposes said top face, and wherein said bottom face has a first end, a second end, and a middle section disposed between said first end and said second end of said bottom face;
   a first face that separates said top face from said bottom face, wherein said first face has a first end, a second end, and a middle section disposed between said first end and said second end;
   an angled nose face having 5 sides and having a first end, a second end, and a middle section disposed between said first end and said second end, wherein said first end of said nose face is in communication with said first end of said bottom face;
   a flank face positioned downward from said nose face, wherein said flank face has a first end, a second end, and a middle section disposed between said first end and said second end, wherein said first end of said flank face is in communication with said second end of said nose face;
   a second face, a fourth face and a third face that is disposed between said second face and said fourth face, wherein said third face is opposed to said first face, wherein one side of said second face is positioned outwardly and downwardly in relationship to said bottom face, and wherein said fourth face is positioned outwardly and downwardly in relationship to said top face, wherein said third face is in communication with said second face and said fourth face, respectively, to form a relaxed "U" shape, and wherein each of said second, third and fourth faces, respectively, have a first end, a second end, and a middle section disposed between said first and said second ends, respectively, wherein said first end of said second face and said first end of said third face are each in communication with a side of said nose face, and wherein said first end of said fourth face is in communication with a side of said flank face; and
   a rear face having a first end, a second end, and a middle section disposed between said first end and said second end, wherein said first end of said rear face forms a relaxed "U" shape that is in communication with said second ends of said second, third and fourth faces, respectively, and wherein said second end of said rear face is in communication with said second end of said first face.

17. The seed boot of claim 1 wherein said seed boot is made by casting from a material selected from the group consisting of austempered ductile iron and chrome iron.

18. The seed boot of claim 1 wherein said wear resistant leading and trailing inserts are secured to said forward lower surface of said wing by brazing.

19. The seed boot attachment of claim 1 wherein said wear resistant leading insert comprises from about 15 to 22 weight percent cobalt with the remainder being tungsten carbide, and wherein said wear resistant trailing insert comprises from about 8 to 14 weight percent cobalt with the remainder being tungsten carbide.

20. The seed boot attachment of claim 1 wherein said cobalt concentration of said wear resistant leading insert is about 20 weight percent and wherein said cobalt concentration of said wear resistant trailing insert is about 11 weight percent.

21. A modular seed planting system comprising an elongated tool bar supported for movement by a plurality of wheels and which is adapted to be towed in a given forward direction by a power, attached to the tool bar are a plurality of planting tools mounted along the length of the tool bar, each planting tool including a soil opener having a furrowing tip and a seed boot removably attached to a rear portion of said soil opener wherein said seed boot comprises a synclinal shape housing extending to a forward point, at least one furrow forming wing having opposing outer and inner side surfaces that converge and extending rearwardly and downwardly from opposing side edges of a forward lower surface of said wing wherein one of said side edges of said forward lower surface of said wing is a furrow forming edge; and at least one wear resistant leading insert secured to at least a portion of one of said forward lower surface of said wing in juxtaposition to said furrow forming edge of said wing; and at least one wear resistant trailing insert secured to at least a portion of said forward lower surface of said wing in juxtaposition to said furrow forming edge, and wherein said wear resistant leading insert is positioned in front of and in juxtaposition to said wearing resistant trailing insert.

22. The modular seed planting system of claim 21, including wherein said wear resistant leading insert comprises:
   a top face having a first end, a second end and a middle section disposed between said first and said second ends, respectively, and wherein said top face has a first side and a second side that is at a right angle in relationship to and in communication with said first side of said top face, and a hypotenuse side having a flat first end, an arcuate shaped second end, and an arcuate shaped middle section that is disposed between said flat first end and said arcuate shaped second end, wherein said first end of said hypotenuse side is in communication with said second side of said top face and wherein said second end of said hypotenuse side is in communication with said first side of said top face;
   a bottom face that is parallel to and opposes said top face and that is a mirror image of said top face, and wherein said bottom face has a first end, a second end, and a middle section disposed between said first end and said second end of said bottom face;
   a first face that separates said top face from said bottom face, wherein said first face is in communication with and follows along the paths formed by said hypotenuse sides of said top and bottom faces, respectively, wherein said first face has a first end, a second end, and a middle section that is disposed between said first and said second ends, respectively, of said first face, wherein said first end of said first face has a flat surface that is in communication with a downwardly angled surface of said middle section, and wherein said second end of said first face is in communication with and is positioned in a downwardly angled direction in relationship to said middle section;
   an angled nose face having six sides and having a first end, a second end and a middle section that is disposed between said first and second ends, respectively, wherein said first end of said nose face is in communication with said second end of said first face, wherein said second end of said nose face is in communication with each of said first ends of said top face and said bottom face, respectively, and wherein said second end of said nose comprises three of said six sides including wherein said three sides of said second end form a relaxed "U" shape;

a second face, a fourth face and a third face that is disposed between said second face and said fourth face, wherein said third face is opposed to said first face, wherein one side of said second face is positioned inwardly and downwardly in relationship to said first side of said top face, wherein one side of said fourth face is positioned inwardly and downwardly in relationship to said first side of said bottom face, wherein said third face is in communication with said second face and said fourth face, respectively, to form a relaxed "U" shape, and wherein each of said second, third and fourth faces, respectively, have a first end, a second end and a middle section disposed between said first and said second ends, respectively, and wherein said second ends of said second, third and fourth faces, respectively are in communication with at least three of said sides making up said relaxed "U" shape of said second end of said nose face; and a rear face having a relaxed "U" shaped first end, a straight shaped second end, and a planar middle section disposed between said first and said second ends, respectively, of said rear face, wherein said relaxed "U" shaped first end of said rear face is in communication with said first ends of said second, third and fourth faces, respectively, and wherein said second end of said rear face is in communication with said first end of said flat first face.

23. The modular seed planting system of claim 21, including wherein said wear resistant trailing insert comprises:

a top face having a trapezoidal shape;

a bottom face that is parallel to and opposes said top face, and wherein said bottom face has a first end, a second end and a middle section disposed between said first end and said second end of said bottom face;

a first face that separates said top face from said bottom face, wherein said first face has a first end, a second end, and a middle section disposed between said first end and said second end;

an angled nose face having 5 sides and having a first end, a second end, and a middle section disposed between said first end and said second end, wherein said first end of said nose face is in communication with said first end of said bottom face;

a flank face positioned downward from said nose face, wherein said flank face has a first end, a second end, and a middle section disposed between said first end and said second end, wherein said first end of said flank face is in communication with said second end of said nose face;

a second face, a fourth face and a third face that is disposed between said second face and said fourth face, wherein said third face is opposed to said first face, wherein one side of said second face is positioned outwardly and downwardly in relationship to said bottom face, and wherein said fourth face is positioned outwardly and downwardly in relationship to said top face, wherein said third face is in communication with said second face and said fourth face, respectively, to form a relaxed "U" shape, and wherein each of said second, third and fourth faces, respectively, have a first end, a second end, and a middle section disposed between said first and said second ends, respectively, wherein said first end of said second face and said first end of said third face are each in communication with a side of said nose face, and wherein said first end of said fourth face is in communication with a side of said flank face; and a rear face having a first end, a second end, and a middle section disposed between said first end and said second end, wherein said first end of said rear face forms a relaxed "U" shape that is in communication with said second ends of said second, third and fourth faces, respectively, and wherein said second end of said rear face is in communication with said second end of said first face.

24. The modular seed planting system of claim 21, including wherein said wear resistant leading and trailing inserts are formed from cemented carbide having a cobalt content of from about 8 to 22 weight percent.

25. The modular seed planting system of claim 21 wherein said wear resistant leading and trailing inserts are formed from a material selected from the group consisting of tungsten carbide and tungsten-titanium carbide and including a cobalt concentration of from about 8 to 22 weight percent.

26. The modular seed planting system of claim 24 wherein said wear resistant leading insert is formed from cemented carbide comprising a cobalt concentration of from about 15 to 22 weight percent.

27. The modular seed planting system of claim 21 wherein said wear resistant leading insert comprises from about 15 to 22 weight percent cobalt and the remainder being tungsten carbide.

28. The modular seed planting system of claim 24 wherein said wear resistant trailing insert is formed from cemented carbide comprising a cobalt concentration from about 8 to 14 weight percent.

29. The modular seed planting system of claim 21 wherein said wear resistant trailing insert comprises from about 8 to 14 weight percent cobalt and the remainder being tungsten carbide.

30. The seed boot of claim 21 wherein said seed boot attachment is made by casting from a material selected from the group consisting of austempered ductile iron and chrome iron.

31. A wear resistant leading insert of a seed boot comprising:

a top face having a first end, a second end and a middle section disposed between said first and said second ends, respectively, and wherein said top face has a first side and a second side that is at a right angle in relationship to and in communication with said first side of said top face, and a hypotenuse side having a flat first end, an arcuate shaped second end, and an arcuate shaped middle section that is disposed between said flat first end and said arcuate shaped second end, wherein said first end of said hypotenuse side is in communication with said second side of said top face and wherein said second end of said hypotenuse side is in communication with said first side of said top face;

a bottom face that is parallel to and opposes said top face and that is a mirror image of said top face, and wherein said bottom face has a first end, a second end and a middle section disposed between said first end and said second end of said bottom face;

a first face that separates said top face from said bottom face, wherein said first face is in communication with and follows along the paths formed by said hypotenuse sides of said top and bottom faces, respectively, wherein said first face has a first end, a second end, and a middle section that is disposed between said first and said second ends, respectively, of said first face, wherein said first end of said first face has a flat surface that is in communication with a downwardly angled surface of said middle section, and wherein said second end of said first face is in communication with and is positioned in a downwardly angled direction in relationship to said middle section;

an angled nose face having six sides and having a first end, a second end and a middle section that is disposed between said first and second ends, respectively, wherein said first end of said nose face is in communication with said second end of said first face, wherein said second end of said nose face is in communication with each of said first ends of said top face and said bottom face, respectively, and wherein said second end of said nose comprises three of said six sides including wherein said three sides of said second end form a relaxed "U" shape;

a second face, a fourth face and a third face that is disposed between said second face and said fourth face, wherein said third face is opposed to said first face, wherein one side of said second face is positioned inwardly and downwardly in relationship to said first side of said top face, wherein one side of said fourth face is positioned inwardly and downwardly in relationship to said first side of said bottom face, wherein said third face is in communication with said second face and said fourth face, respectively, to form a relaxed "U" shape, and wherein each of said second, third and fourth faces, respectively, have a first end, a second end and a middle section disposed between said first and said second ends, respectively, and wherein said second ends of said second, third and fourth faces, respectively are in communication with at least three of said sides making up said relaxed "U" shape of said second end of said nose face; and a rear face having a relaxed "U" shaped first end, a straight shaped second end, and a planar middle section disposed between said first and said second ends, respectively, of said rear face, wherein said relaxed "U" shaped first end of said rear face is in communication with said first ends of said second, third and fourth faces, respectively, and wherein said second end of said rear face is in communication with said first end of said flat first face.

32. The wear resistant leading insert of claim 31 formed from cemented carbide having a cobalt content from about 15 to 22 weight percent.

33. The wear resistant leading insert of claim 31 formed from a material selected from the group consisting of tungsten carbide and tungsten-titanium carbide and including a cobalt concentration of from about 15 to 22 weight percent.

34. The wear resistant leading insert of claim 31 comprising from about 15 to 22 weight percent cobalt and the remainder being tungsten carbide.

35. The wear resistant leading insert of claim 34 comprising about 22 weight percent cobalt and the remainder being tungsten carbide.

36. The wear resistant leading insert of claim 31 wherein each of said first side of said top face and said bottom face, respectively, are chamfered.

37. The wear resistant leading insert of claim 31 wherein said angled nose face has a slope that proceeds downward from said second end of said first face to said first ends of said top and bottom faces, respectively.

38. The wear resistant leading insert of claim 37 wherein said slope of said nose face is from about 40 to 60 degrees.

39. The wear resistant leading insert of claim 38 wherein said slope of said nose face is about 50 degrees.

40. The wear resistant leading insert of claim 38 wherein said slope of said nose face is about 45 degrees.

41. A wear resistant trailing insert of a seed boot comprising:

a top face having a trapezoidal shape;

a bottom face that is parallel to and opposes said top face, and wherein said bottom face has a first end, a second end, and a middle section disposed between said first end and said second end of said bottom face;

a first face that separates said top face from said bottom face, wherein said first face has a first end, a second end, and a middle section disposed between said first end and said second end;

an angled nose face having 5 sides and having a first end, a second end, and a middle section disposed between said first end and said second end, wherein said first end of said nose face is in communication with said first end of said bottom face;

a flank face positioned downward from said nose face, wherein said flank face has a first end, a second end, and a middle section disposed between said first end and said second end, wherein said first end of said flank face is in communication with said second end of said nose face;

a second face, a fourth face and a third face that is disposed between said second face and said fourth face, wherein said third face is opposed to said first face, wherein one side of said second face is positioned outwardly and downwardly in relationship to said bottom face, and wherein said fourth face is positioned outwardly and downwardly in relationship to said top face, wherein said third face is in communication with said second face and said fourth face, respectively, to form a relaxed "U" shape, and wherein each of said second, third and fourth faces, respectively, have a first end, a second end, and a middle section disposed between said first and said second ends, respectively, wherein said first end of said second face and said first end of said third face are each in communication with a side of said nose face, and wherein said first end of said fourth face is in communication with a side of said flank face; and a rear face having a first end, a second end, and a middle section disposed between said first end and said second end, wherein said first end of said rear face forms a relaxed "U" shape that is in communication with said second ends of said second, third and fourth faces, respectively, and wherein said second end of said rear face is in communication with said second end of said first face.

42. The wear resistant trailing insert of claim 41 formed from cemented carbide having a cobalt content from about 8 to 14 weight percent.

43. The wear resistant trailing insert of claim 41 formed from a material selected from the group consisting of tungsten carbide and tungsten-titanium carbide and including a cobalt concentration of from about 8 to 14 weight percent.

44. The wear resistant trailing insert of claim 41 comprising from about 8 to 14 weight percent cobalt and the remainder being tungsten carbide.

45. The wear resistant leading insert of claim 44 comprising about 11 weight percent cobalt and the remainder being tungsten carbide.

* * * * *